M. SCHNEIDER.
HAT-PIN GUARD.
APPLICATION FILED JUNE 17, 1911.
1,013,957.
Patented Jan. 9, 1912.
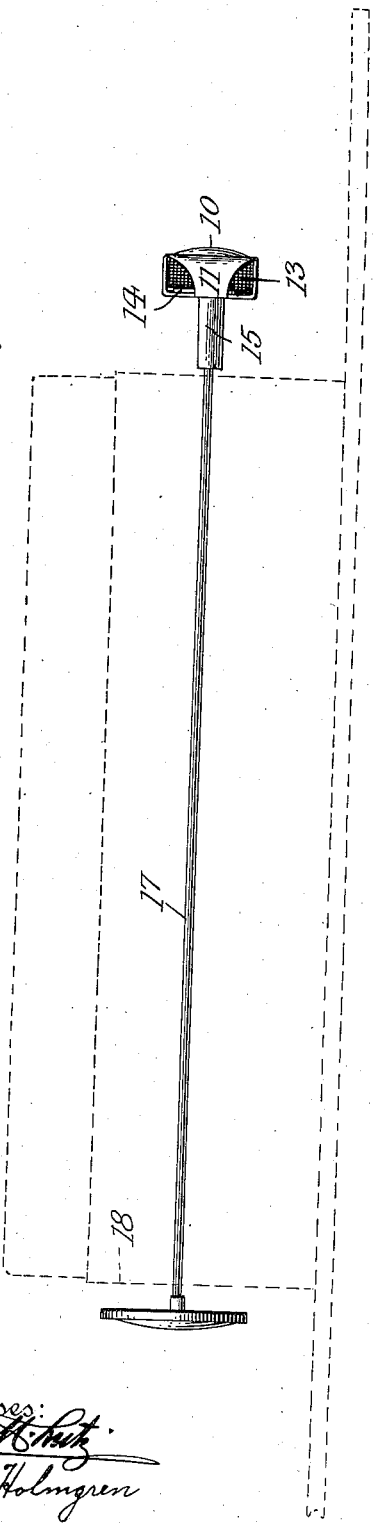
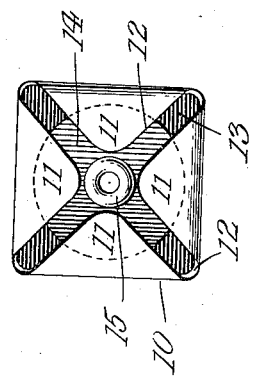
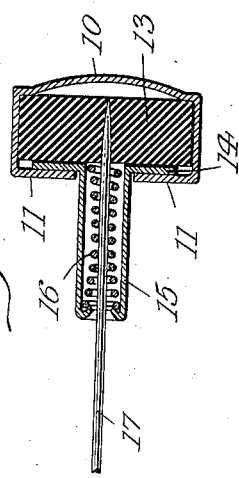
Witnesses:
Inventress:
Magdalena Schneider,
By her Attorneys

UNITED STATES PATENT OFFICE.

MAGDALENA SCHNEIDER, OF JERSEY CITY, NEW JERSEY.

HAT-PIN GUARD.

1,013,957.     Specification of Letters Patent.     Patented Jan. 9, 1912.

Application filed June 17, 1911. Serial No. 633,747.

*To all whom it may concern:*

Be it known that I, MAGDALENA SCHNEIDER, a citizen of the United States, residing at Jersey City, county of Hudson, and State of New Jersey, have invented a new and Improved Hat-Pin Guard, of which the following is a specification.

This invention relates to a hat pin guard of novel construction, which is adapted to be projected over the point of a hat pin, after the latter has been thrust through the hat. In this way any danger of becoming pricked, scratched or otherwise injured by the pin point is effectively obviated.

In the accompanying drawing: Figure 1 is a side view of my improved guard showing it applied to a hat pin; Fig. 2 a longitudinal section thereof, and Fig. 3 an inner face view.

The guard comprises essentially a shell or cap 10 made preferably of sheet metal or other bendable material and ornamented in suitable manner. The cap is provided with a number of claws 11, separated by slits 12 and bent around a soft rubber block 13. This block which constitutes a pad or cushion is thus securely confined within the shell. Between claws 11 and pad 13 there is interposed the flange 14 of a forwardly extending tubular nozzle 15, the claws being at the inner ends so spaced as to accommodate the nozzle between them. Within nozzle 15 is located a suitable friction clutch shown to consist of a helical spring 16, the convolutions of which gradually decrease in diameter from the ends toward the center of the nozzle. The peculiar construction of this clutch may however be varied within the scope of the appended claim without departing from the spirit of my invention.

In assembling the parts, the flange 14 of nozzle 15 is placed against pad 13 and then the claws 11 of cap 10 are turned around the pad and pressed firmly against the flange. In this way the cap assumes the double function of inclosing the pad and securing the nozzle to said pad, while flange 14 prevents the claws from sinking into the body of the latter. In case the pad is to be renewed, claws 11 are unbent so as to release the same as well as the nozzle-flange and permit a new pad to be introduced.

In use the hat pin 17 is thrust through the hat 18 and then the guard is passed with its nozzle 15 over the free end of the pin, so that the latter will became engaged by the clutch 16, while the pin point will enter the pad. In this way the pin is effectively protected and the guard is so firmly impaled thereon, that it is not liable to drop off during wear.

I claim:

A hat pin guard comprising a pad, a pin-receiving nozzle having a flange that rests against said pad, and a cap engaging the pad and having a plurality of bendable spaced claws folded around the pad and against the nozzle flange thereby removably holding the pad between cap and flange.

MAGDALENA SCHNEIDER.

Witnesses:
   FRANK V. BRIESEN,
   KATHERYNE KOCH.

Copies of this patent may be obtained for five cents each, by addressing the "Commissioner of Patents, Washington, D. C."